United States Patent [19]

Trieb et al.

[11] Patent Number: 4,769,763
[45] Date of Patent: Sep. 6, 1988

[54] CONTROL FOR COORDINATE MEASURING INSTRUMENTS

[75] Inventors: Gerhard Trieb, Konigsbronn; Karl Schepperle, Oberkochen; Karl-Eugen Aubele, Gussenstadt, all of Fed. Rep. of Germany

[73] Assignee: Carl-Zeiss-Stiftung, Heidenheim/Brenz, Fed. Rep. of Germany

[21] Appl. No.: 874,696

[22] Filed: Jun. 16, 1986

[30] Foreign Application Priority Data

Jun. 28, 1985 [DE] Fed. Rep. of Germany ....... 3523188

[51] Int. Cl.$^4$ .............................................. G01B 7/28
[52] U.S. Cl. .................................... 364/559; 364/474; 33/503; 33/504
[58] Field of Search ............... 364/559, 560, 565, 506, 364/507, 512, 472, 468, 579, 580; 33/503–505; 318/574–576

[56] References Cited

U.S. PATENT DOCUMENTS

| | | | |
|---|---|---|---|
| 3,292,495 | 7/1966 | Hill et al. | 409/84 |
| 4,118,871 | 10/1978 | Kirkham | 364/560 |
| 4,215,299 | 7/1980 | Edwin et al. | 318/574 |
| 4,224,670 | 10/1980 | Yamazaki | 364/474 |
| 4,437,151 | 3/1984 | Hurt et al. | 364/559 |
| 4,530,159 | 7/1985 | Ernst | 33/503 |
| 4,653,011 | 3/1987 | Iwano | 33/504 |

FOREIGN PATENT DOCUMENTS 2242355 8/1972 Fed. Rep. of Germany.
2921166 11/1980 Fed. Rep. of Germany.

*Primary Examiner*—Parshotam S. Lall
*Assistant Examiner*—Brian M. Mattson
*Attorney, Agent, or Firm*—Hopgood, Calimafde, Kalil, Blaustein & Judlowe

[57] ABSTRACT

A "scanning" work-contact probe is deflectable with respect to a measuring-machine head which is driven by the three-coordinate drive system of the measuring machine. The arrangement is such that the probe continuously tracks (scans) a desired profile of a workpiece and, in doing so, measured probe increments (decrements) of deflection with respect to the head are so mathematically combined with head-position data that, in the further circumstance of holding path-velocity magnitude $|\vec{V}_{des.}|$ of the measuring machine to a constant value, the orientation of the probe head with respect to the locally contacted slope of the workpiece can also be a constant.

9 Claims, 2 Drawing Sheets

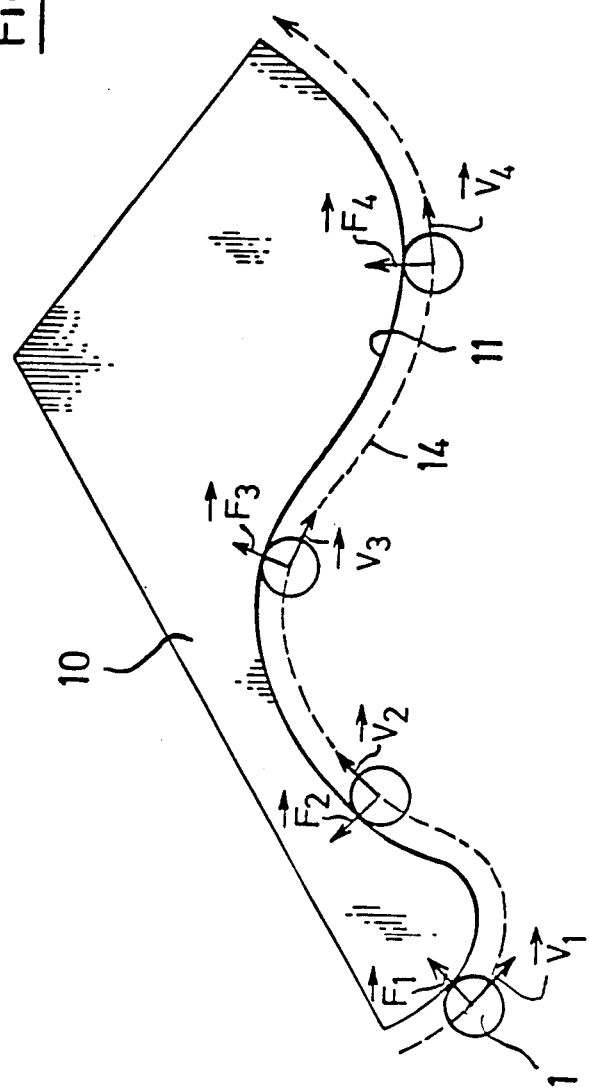

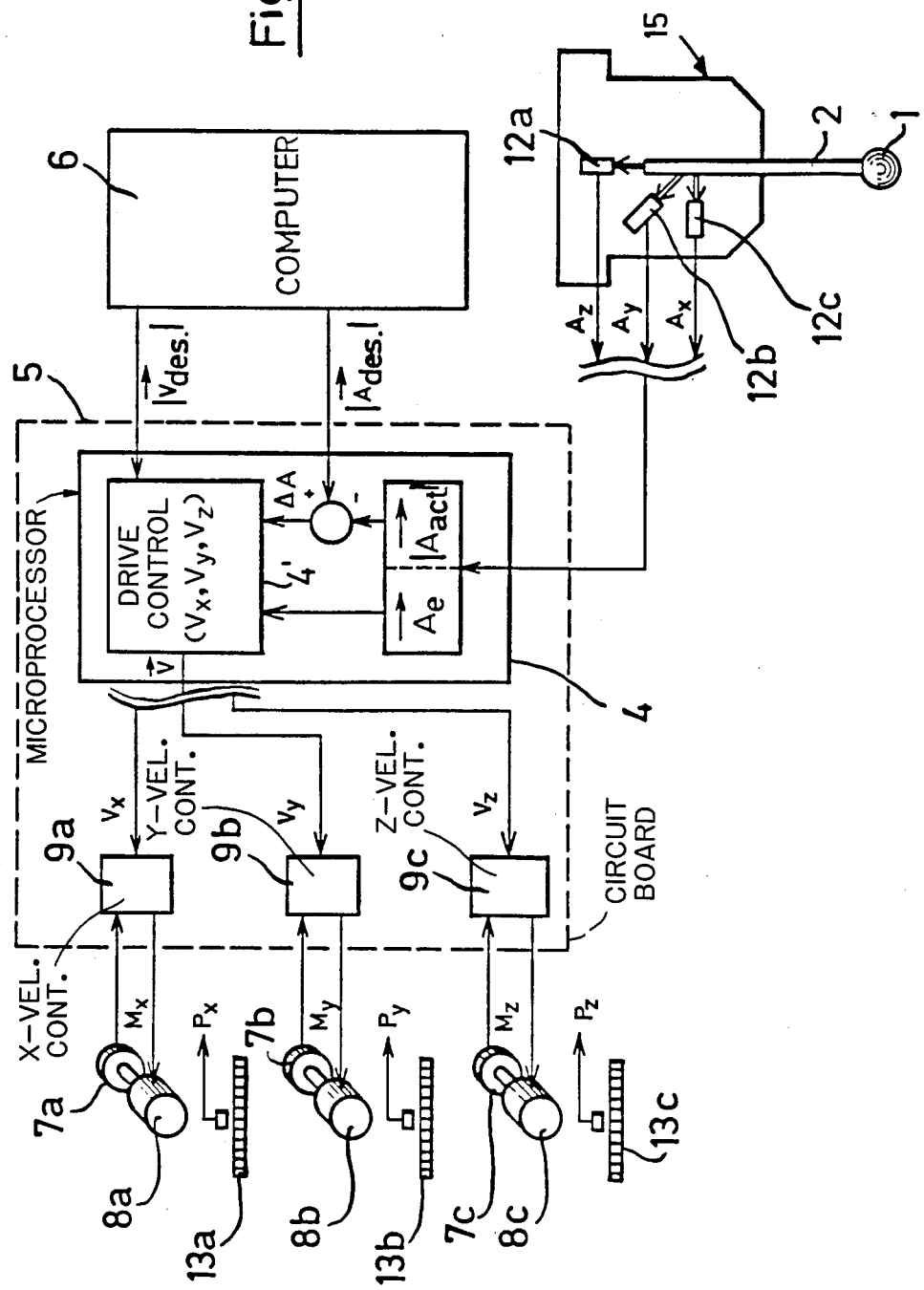

CONTROL FOR COORDINATE MEASURING INSTRUMENTS

BACKGROUND OF THE INVENTION

The present invention relates to a method and arrangement for automatically measuring a workpiece on a coordinate measuring machine, in which the work-contact probe or scanning pin of the measuring machine is moved continuously along the surface of the workpiece, and in which electrical signal outputs of measurement transducers in the scanning head (upon deflection of the probe pin) are used both to form the measurement value and to control the machine drives.

Measurement methods which continuously scan the workpiece are generally referred to as scan or scanning methods. In known scanning methods, the scanning pin of the scanning head is clamped with respect to two coordinate directions and is moved in the direction of one of the clamped axes, while in the third coordinate the scanning pin is movable substantially perpendicular to the surface of the workpiece and slides along it. In order to maintain contact between workpiece and scanning pin and to maintain a constant force of workpiece engagement, the measurement transducer serving for the measurement of scanner deflection in this third coordinate is switched into the position-control circuit for the machine axis in question.

Since in this method the direction of scanning is always bound to a machine axis, it is necessary, if the angle between the direction of travel and surface of the workpiece is large and exceeds about 60°, to effect a "reclamping", i.e., the scanning direction and the measurement direction are interchanged; as a consequence, therefore, the measurement process must first of all be interrupted. Furthermore, the measurement force changes in the course of the scanning, due to substantial friction between the scanning pin and the workpiece, the friction being a function of the instantaneous angle between the scanning direction and the surface of the workpiece.

From West German published patent application OS No. 2,921,166, it is shown to effect an automatic switching between scanning direction and measuring direction when the control voltages in the control circuits of the drive axes for the measurement direction and for the scanning direction are the same.

In this known method, since scanning direction is also bound to a given drive coordinate of the machine, changes in the measurement force exerted on the workpiece also take place, thus affecting the result of the measurement, since only the components of the measurement force in the axis controlled by the scanning head are maintained constant; i.e., the resultant total measurement force is not held constant. The scanning process furthermore does not take place uniformly, since only the velocity in one drive direction is held constant; i.e., velocity varies along the actual path, and this variation is dependent on the geometry of the workpiece.

BRIEF STATEMENT OF THE INVENTION

The object of the present invention is to provide a scanning method and an arrangement suitable for the carrying out thereof which assure as uniform as possible a scanning process with constant total measurement force.

This object is attained by providing means to assure that:

(a) the magnitude $|\vec{V}_{des.}|$ of the path velocity resulting as vector sum from the individual velocities $(V_i)$ in the coordinate directions can be pre-established as a desired value and held constant, (b) the scanner deflection or the amount thereof $|\vec{A}_{des.}|$ can also be pre-established and can be compared with the measured scanner deflection or the amount $|\vec{A}_{act.}|$ respectively, (c) a signal corresponding to the deviation $\Delta \vec{A}$ between the measured and the pre-established scanner deflections, as well as a signal corresponding to the direction of the scanner deflection $\vec{A}_e$, can be formed and used for correcting the direction $\vec{V}_e$ of the path velocity $\vec{V}_{act.}$ The method of the invention does away with rigid separation between scanning direction and measuring direction. Rather, velocity is kept constant on a path which follows the contour of the workpiece; in this connection, the individual velocities in the drive axes of the machines may definitely vary with time.

The method provides assurance that, even in combination with scanning heads in which the scanning pin is continuously urged, e.g., spring-urged, into its zero position (and in which, therefore, the measurement force exerted on the workpiece is proportional to this deflection), the resultant total measurement force remains constant during the scanning process, since for each deviation in deflection of the scanning pin from the pre-established desired value, the direction of the scanning movement changes in a manner which compensates for this deviation.

The method can, however, also be used to advantage in combination with scanning heads of the type described in West German Pat. No. 2,242,355 which has active moving-coil systems for the application of a pre-established deflection-independent measurement force to the scanning pin of the measurement head. It is then advisable to deflect the scanning pin in advance and to apply to the pin a constant measurement force which is independent of the amount of the deflection and which is substantially perpendicular to the instantaneous direction of the scanning velocity. In this way, the entire range of deflection of the scanning pin can be permitted as the control deviation, thus permitting higher scanning velocities without loss of measurement precision.

The arrangement for carrying out the method comprises a control unit which receives the output signals of at least two measurement transducers of the scanning head, these measurement transducers being associated with the controlled machine axes. The magnitude of scanning-pin deflection and the magnitude of the scanning velocity can be entered as the desired values. The control unit conducts signals corresponding to the components of the newly computed path velocity as command variables to the velocity-control circuits of the involved machine axes.

The control unit is preferably fed with the signals of all measurement transducers in the scanning pin, these signals being associated with the three orthogonal directions in space x, y, z; and the control unit acts on the velocity-control circuits of all three machine axes, so that the position of the plane in which a workpiece is to be scanned can be freely selected.

The control unit can, for example, be a process computer which serves to control all machine functions.

Alternatively, it is also possible to use an independent microprocessor for the computation of change in scanning direction as a function of scanning-pin deflection, the microprocessor being connected to the position and velocity-control circuits, and there being referencing inputs to the microprocessor from the process computer of the measuring machine, the process computer having stored preselected values of the magnitude of path velocity, of the initial direction of scanning movement, of the measurement force, of the final position, etc.

DETAILED DESCRIPTION

The invention will be described in detail, in conjunction with the accompanying drawings, in which:

FIG. 1 is a diagrammatic sectional view of the contour of a workpiece, showing the scanning line of a scanner guided along the contour, in accordance with the invention; and FIG. 2 is a block diagram, schematically showing apparatus for controlling a measurement machine in accordance with the invention.

In FIG. 1, a workpiece 10 is to be scanned on a coordinate-measurement machine, along its contour line 11. A scanning ball 1, at the tip end of a probe or scanning pin 2 (FIG. 2), is in continuous contact with the workpiece 10, and therefore follows a scanning path 14 which is parallel to the contour line 11.

In order for the scanning process to proceed as uniformly and as error-free as possible, a control is provided to hold constant the magnitude of the velocity $|\vec{V}|$ with which the center of the scanning ball moves along the curved path 14. In other words, for the scanning-ball positions shown:

$$|\vec{V_1}| = |\vec{V_2}| = |\vec{V_3}| = |\vec{V_4}|$$

At the same time, the measurement force F, which is directed substantially perpendicular to the contour line 11, is also held at constant magnitude, so that, for the scanning-ball positions shown:

$$|\vec{F_1}| = |\vec{F_2}| = |\vec{F_3}| = |\vec{F_4}|$$

The block diagram of an arrangement which assures these relationships is given in FIG. 2.

Three motors 8a, 8b, 8c having tachometer generators 7a, 7b, 7c on their shafts represent the drive of a measurement machine, not otherwise shown. The three motors 8 will be understood to determine movement of the scanning head 15 of the measurement machine in each of three coordinate directions x, y, z. To determine measurement value, the process computer 6 of the measurement machine combines the respective coordinate values of x, y, z position with corresponding coordinate values of scanning-pin (2) deflection. More specifically, coordinate-position values are provided as output signals $P_x$, $P_y$, $P_z$ of position transducers which form part of the respective head-displacement-measuring systems 13a, 13b, 13c associated with the respective machine axes; and the pin-deflection values are available as output signals $A_x$, $A_y$, $A_z$ of pin-deflection measurement transducers 12a, 12b, 12c carried with the scanning head 15. Computer operation is involved (a) in combining such values, (b) in forming a measurement value therefrom, and (c) in displaying the result; such computer operation is not part of the invention and therefore need not now be considered in detail.

A microprocessor 4 on a circuit board 5 includes a control unit 4' to control drive along each of the respective machine axes x, y, z. This microprocessor supplies, inter alia, correctional variables $V_x$, $V_y$, $V_z$ to velocity-control circuits 9a, 9b, 9c for the respective drive motors 8a, 8b, 8c; and the electronic part of control circuits 9a, 9b, 9c is also located on the board 5.

To carry out the scanning process indicated in FIG. 1, microprocessor 4 is instructed by the process computer 6 as to the desired path-velocity magnitude $|\vec{V}_{des.}|$ and as to the desired magnitude $|\vec{A}_{des.}|$ of scanner deflection, it being noted that return movement of the scanning pin 2 is effected by a spring system, so that the force $\vec{F}$ between workpiece 10 and the scanning ball 1 is proportional to scanner-pin deflection A. At the same time, microprocessor 4 receives the signals $A_x$, $A_y$, $A_z$ generated by the measurement-value transducers 12a, 12b, 12c in the scanning head 15; it is from these signals $A_x$, $A_y$, $A_z$ that the actual value $|\vec{A}_{act.}|$ of scanner deflection and the direction $\vec{A}_e$ of scanning-pin deflection are calculated.

The microprocessor 4 compares the pre-established value $|\vec{A}_{des.}|$ and the actual value $|\vec{A}_{act.}|$ of the magnitude of scanner deflection; and, if there are deviations ΔA between these two values, microprocessor 4 changes the direction of travel velocity $\vec{V}$ in accordance with the following computation, shown in simplified vector form:

$$V_2 = \frac{V_o}{|V_o|} \cdot |V_{des.}|, \text{ wherein}$$

$$\vec{V_o} = V_1 + \frac{A_{act.}}{|A_{act.}|} \cdot (|A_{des.}| - |A_{act.}|) = V_1 + A_e \cdot \Delta A$$

In the above expression, $\vec{A}_e$ is the unit vector in the direction of scanner deflection, and it results from $$A_e = \frac{\vec{A}_{act.}}{|A_{act.}|}$$

The new computed vector of the path velocity $\vec{V}_2$ is therefore, with magnitude having been held constant, rotated in the direction of the scanner deflection $\vec{A}_e$, the extent of rotation being with respect to the vector of the preceding velocity $\vec{V}_1$.

The new path velocity $V_2$ computed by the microprocessor is then, after splitting into its components $V_x$, $V_y$, $V_z$, fed as correcting variables to the respective velocity-control circuits 9a, 9b, and 9c of the machine drives.

Since adaptation of scanning direction to the deflection of the scanning point takes place continuously at a speed which is derived from the time base of the microprocessor system, the movement of the scanning head 15 automatically adapts itself (within tolerable limits of control deviation ΔA) to the contour line 11 of the workpiece 10; this automatic adaptation follows from the fact that, as soon as the actual scanner deflection $|\vec{A}_{act.}|$ exceeds the desired value $|\vec{A}_{des.}|$ provided by the control computer 6, the direction of the path velocity V changes in a manner which compensates for the deviation ΔA. And in the circumstance of computation, speed that is sufficiently rapid as compared with the path velocity $\vec{V}$, one obtains a quasi-continuous movement of the scanning head 15 along the contour of the workpiece.

In the example described, it has been assumed that return motion of the scanning pin is effected by a spring system. In such a scanning head, deflection of the scanning pin takes place automatically and practically perpendicular to the surface of the workpiece; and, since its magnitude is maintained constant, the measurement force F between workpiece 10 and scanning ball 1 also remains constant.

The arrangement shown in FIG. 2 can, however, also be used with scanning heads of the type described, for example, in West German Pat. No. 2,242,355, which does not have return springs but, rather, active moving-coil systems for applying a deflection-independent measurement force to the scanning pin. The "spring characteristic" can in that case be developed electrically, in such a manner that a signal which is proportional to deflection in the corresponding coordinate is fed to the measurement-force coils.

In the case of such scanning heads, it is more advantageous to apply the measurement force independently of the deflection and in a direction which is derived from the actual path of movement and which is perpendicular to the path velocity. The desired value $|\vec{A}_{des.}|$ for deflection of the scanning pin can then be equated to zero or be kept very small so that the total range of deflection of the scanning pin 2 is available as control deviation. This permits higher path velocities in the scanning movement.

What is claimed is:

1. A control system for a multi-coordinate measuring machine having an individual drive for each of a plurality of coordinate-component directions, said system comprising:
   a velocity-control circuit for each of said drives;
   a control unit for simultaneously controlling at least two of said drives;
   a scanning probe head movable along a path determined by said drives, said head including a probe pin that is deflectable in each of the coordinate-component directions, and plural measuring transducers for generating separate output signals which are proportional to the respective coordinate-component directions of probe-pin deflection, whereby during driven probe-head displacement with said probe pin in continuous contact with a workpiece, the output signals of said transducers are indicative of the respective component directions of path deviation with respect to workpiece contour;
   input means coupled to said control unit for inputting a preselected magnitude $|\vec{V}_{des.}|$ of path velocity;
   said control unit including calculating means connected to said input means and to said transducers for freshly computing control-path velocity as the vector sum of instantaneous path velocity $\vec{V}_1$ and a vector $\vec{A}_e$ corresponding to the vector sum of said transducer-output signals, with the magnitude of the computed control-path velocity corresponding to said preselected magnitude; said calculating means having separate output connections supplying velocity-component values to the respective velocity-control circuits; and
   force-producing means in said probe head for producing a deflection-independent force of workpiece contact by said probe pin, wherein said force is substantially perpendicular to the instantaneous direction of path velocity.

2. The control system of claim 1, in which said force-producing means comprises moving-coil actuators in the scanning head.

3. A control system for a multi-coordinate measuring machine having an individual drive for each of a plurality of coordinate-component directions, said system comprising:
   a velocity-control circuit for each of said drives;
   a control unit for simultaneously controlling at least two of said drives;
   a scanning probe head movable along a path determined by said drives, said head including a probe pin that is deflectable in each of the coordinate-component directions, and plural measuring transducers for generating separate output signals which are proportional to the respective coordinate-component directions of probe-pin deflection, whereby during driven probe-head displacement with said probe pin in continuous contact with a workpiece, the output signals of said transducers are indicative of the respective directions of path-deviation with respect to workpiece contour;
   input means coupled to said control unit for inputting a preselected magnitude $|\vec{V}_{des.}|$ of path velocity;
   said control unit including calculating means connected to said input means and to said transducers for freshly computing control-path velocity as the vector sum of instantaneous path velocity $\vec{V}_1$ and a vector $\vec{A}_e$ corresponding to the vector sum of said transducer-output signals, with the magnitude of the computed control-path velocity corresponding to said preselected magnitude; said calculating means having separate output connections supplying velocity-component values to the respective velocity-control circuits; and
   force-producing means in said probe head for producing a deflection-dependent return force of workpiece contact by said probe pin, said return force being of magnitude proportional to that resulting from deflection of said probe pin.

4. The control system of claim 1 or claim 3, wherein said calculating means calculates output signals to said velocity-control circuits in accordance with the following rule of computation:

$$V_2 = \frac{V_o}{|V_o|} \cdot |V_{des.}|, \text{ wherein}$$

$$V_o = V_1 + \frac{A_{act.}}{|A_{act.}|} \cdot (|A_{des.}| - |A_{act.}|).$$

and in which:
$\vec{V}_1$ is the velocity vector before a given change in direction,
$\vec{V}_2$ is the velocity vector after the given change in direction,
$\vec{A}_{act.}$ is the measured deflection of the scanning pin,
$\vec{A}_{des.}$ is a pre-selected reference deflection of the probe pin when in workpiece contact, and
$|\vec{V}_{des.}|$ is the pre-selected magnitude of the path velocity.

5. The control system of claim 1 or claim 3, wherein the plurality of machine axes is three, and the plurality of measurement transducers in the scanning head is three, said transducers being respectively oriented for response in three orthogonally related directions in space.

6. A multi-coordinate measuring machine having the control system of claim 1 or claim 3 and having a process computer which is used to control all machine functions, wherein the input means of said control unit is connected to said process computer and wherein said preselected magnitude of path velocity is entered into storage in said process computer as a reference value for said control unit.

7. A multi-coordinate measuring machine having the control system of claim 1 or claim 3, wherein said velocity-control circuits are components of position and velocity control means of the machine, wherein said control unit includes a microprocessor which is connected to the position and velocity control means of the machine.

8. A multi-coordinate measuring machine having the control system of claim 1 or claim 3 and having a process computer which is used to control all machine functions, said system being characterized by the fact that the input means of said control unit is connected to said process computer, and that (a) said preselected magnitude of path velocity and (b) a preselected magnitude of probe-pin deflection normal to instantaneous path direction are separately entered into storage as reference values for said control unit.

9. The control system of claim 1 or claim 3, in which said deflectable probe pin includes a mounted-ball tip for workpiece contact.

* * * * *